United States Patent
Broadway et al.

[15] 3,686,553
[45] Aug. 22, 1972

[54] THREE-PHASE ALTERNATING CURRENT SELF-CASCADED ROTARY ELECTRIC MACHINE

[72] Inventors: Alexander Richard William Broadway; William Fong; Gordon Hindle Rawcliffe, all of Bristol, England

[73] Assignee: National Research Development Corporation, London, England

[22] Filed: March 15, 1971

[21] Appl. No.: 124,265

[30] Foreign Application Priority Data

April 23, 1970 Great Britain..........19,548/70

[52] U.S. Cl.................318/199, 318/205, 318/224 R
[51] Int. Cl..............................................H02p 7/36
[58] Field of Search..318/166, 188, 199, 205, 224 R, 318/224 A

[56] References Cited

UNITED STATES PATENTS

| | | | |
|---|---|---|---|
| 1,563,474 | 12/1925 | Creedy | 318/199 |
| 3,017,553 | 1/1962 | Homan | 318/199 |
| 3,339,131 | 8/1967 | Hoel | 318/205 |

*Primary Examiner*—Gene Z. Rubinson
*Attorney*—Larson, Taylor & Hinds

[57] ABSTRACT

The invention provides a three-phase self-cascaded machine with a single stator and rotor combination. Alternative forms of construction are described in that the stator may have two windings, one for each of two pole-numbers, or a single "pole-changing" winding of the pole-amplitude modulation type. The rotor may be of wound type with short-circuit coils or of reluctance type with flux-barrier peripheral members or of hybrid type combining the reluctance and wound forms. All the rotor forms have similar electromagnetic characteristics in that when rotated in a magnetic field of the first stator pole-number, a field of the second stator pole-number is generated.

13 Claims, 17 Drawing Figures

16/6 - POLE P.A.M. WINDING IN 36 SLOTS

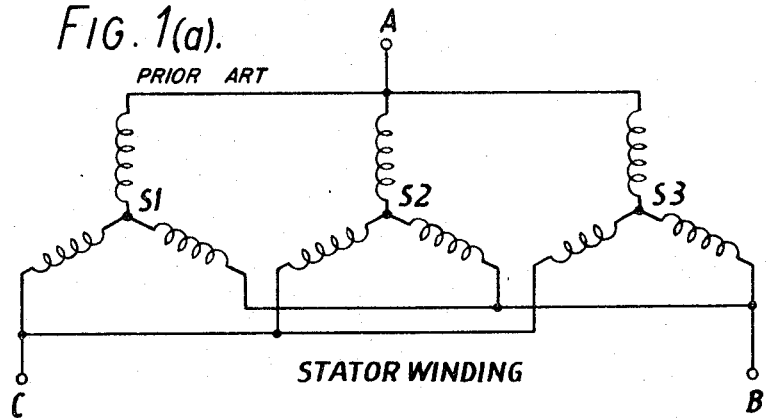

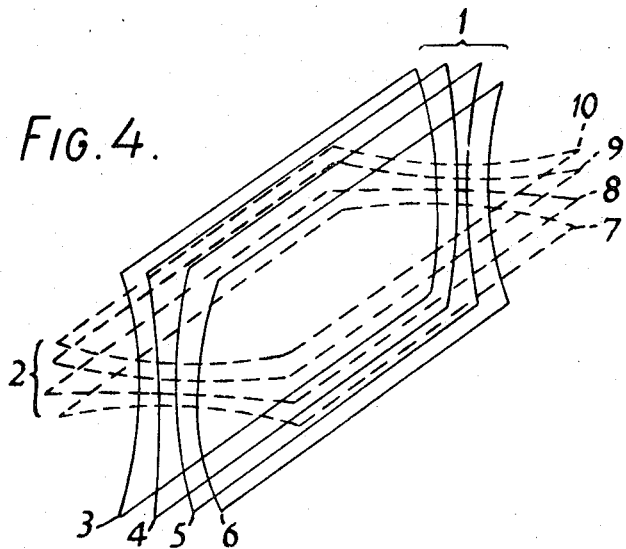
FIG. 4.
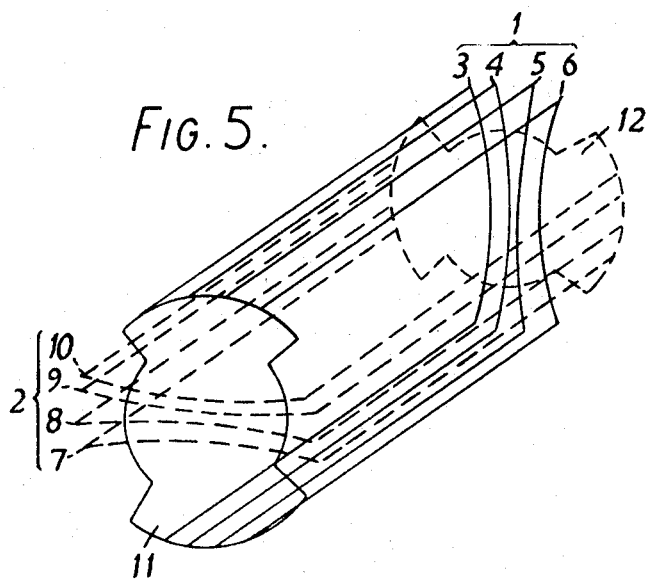
FIG. 5.
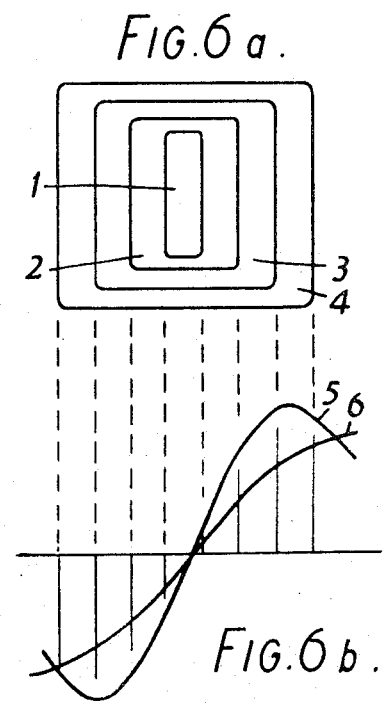
FIG. 6a.
FIG. 6b.

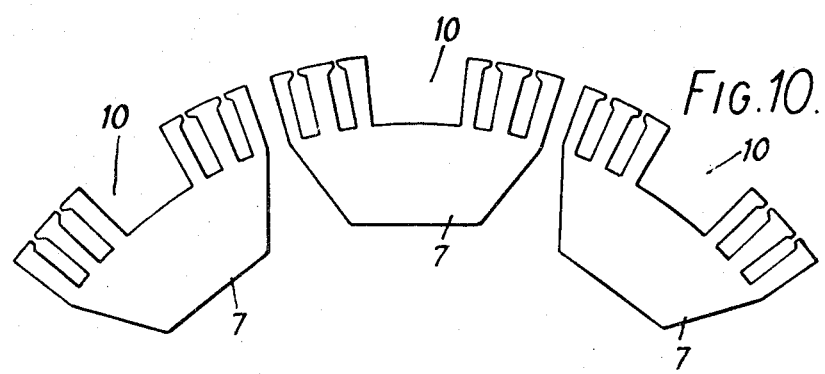
FIG.10.
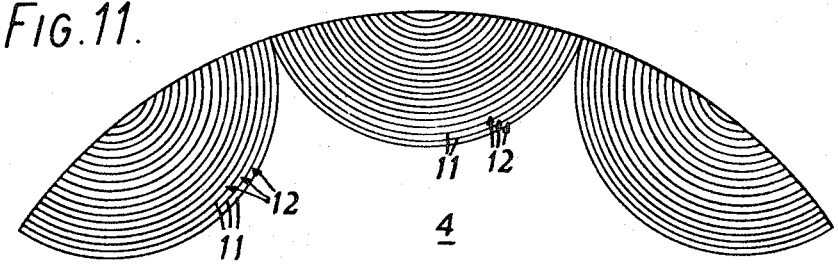
FIG.11.
FIG.12(a).
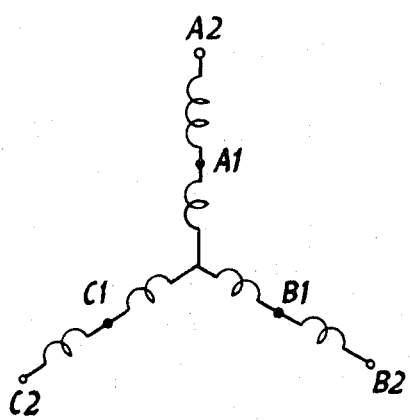
2p POLES : PARALLEL STAR,
2q POLES : SERIES STAR, OR SERIES DELTA
FIG.12(b).
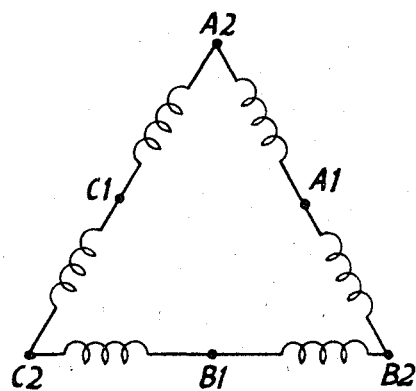
SUPPLY A1, B1, C1. JOIN A2, B2, C2.
SUPPLY A2, B2, C2. ISOLATE A1, B1, C1.

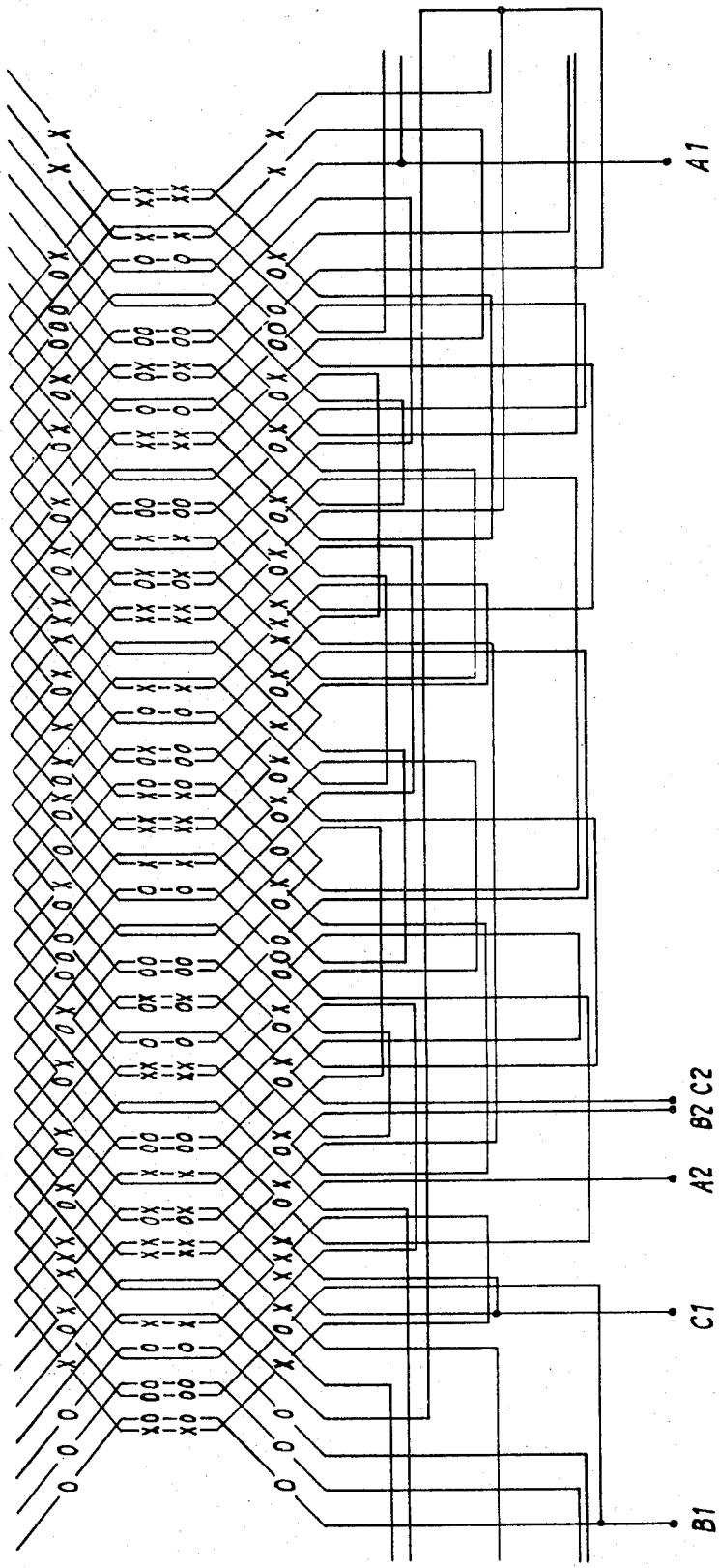
FIG. 13  16/6 - POLE P.A.M. WINDING IN 36 SLOTS

THREE-PHASE ALTERNATING CURRENT SELF-CASCADED ROTARY ELECTRIC MACHINE

This invention relates to rotary electric machines and particularly to self-cascaded three-phase alternating-current machines.

In British Pat. No. 1,155,743, there is described a self-cascaded machine having a squirrel-cage rotor and a stator winding which represents an open circuit at a first pole-number and a short-circuit at a second pole-number, the squirrel-cage rotor having a number of slots equal to half the sum of the first and second pole-numbers.

In British Pat. No. 1,256,091, there is described a self-cascaded machine having an alternative form of rotor compared with the machine described in the earlier patent in that the rotor is wound with a short-circuited rotor winding which corresponds electrically to the simple squirrel-cage rotor of the earlier patent.

The object of the present invention is to provide a self-cascaded machine having further improved rotor windings and rotor construction.

The self-cascaded machine described in the earlier patent is a single-unit version of two separate induction machines connected in cascade. It may be operated asychronously, with resistance control if required, or synchronously, without any external connections to the rotor winding. When driven by a prime-mover, it operates as a brushless alternator, without the rotating diodes and exciter associated with a conventional alternator.

The further developments described in the present specification are particular to the rotor of the self-cascaded machine. A single stator-winding may be chosen from one of the several types described in British Pat. No. 1,256,091. Although a single stator winding, simultaneously responsive to two fields of different pole numbers, is generally to be desired, separate stator windings could be employed. Separate stator windings may be advantageous in some instances, such as for added flexibility of design or operation.

Accordingly, the present invention provides a self-cascaded three-phase alternating current machine having a stator winding and a rotor, the stator winding having component coils connected between two set of terminals and being wound to provide a winding of a first pole-number between a first set of said terminals and a winding of a second pole-number between the second set of said terminals and the rotor being constructed with electromagnetic means such that, when the rotor is rotated relatively to a magnetic field of said first pole-number, said rotor creates a magnetic field of said second pole-number which rotates in the opposite direction from said field of said first pole-number, relatively to the rotor.

The rotor may be wound with a number of short-circuited phase-windings equal to half the sum of the two said pole-numbers or equal to a sub-integral multiple of half the sum of the two said pole-numbers. In such case, the conductors of each phase-winding may be graded according to a compromise curve lying between the sine wave curves corresponding to $2p$ poles and $2q$ poles.

Alternatively, the rotor is of corresponding reluctance type construction or the rotor combines both reluctance type and wound forms.

In order that the invention may be readily carried into practice, known self-cascaded machine windings and embodiments of the present invention will now be described in detail, by way of example, with reference to the accompanying drawings, of which:

FIG. 1 ($a$) shows the stator winding arrangement and FIG. 1($b$) shows the rotor winding arrangement of a known self-cascaded machine;

FIG. 2 shows a part of a known rotor winding for a self-cascaded machine;

FIG. 3 shows a part of an alternative known rotor winding for a self-cascaded machine;

FIG. 4 shows a first rotor winding arrangement according to the present invention, comprising two sets of short-circuited coils at right angles;

FIG. 5 shows a second rotor winding according to the invention, comprising two sets of coils at right-angles short-circuited by two end rings;

Figure 7A:
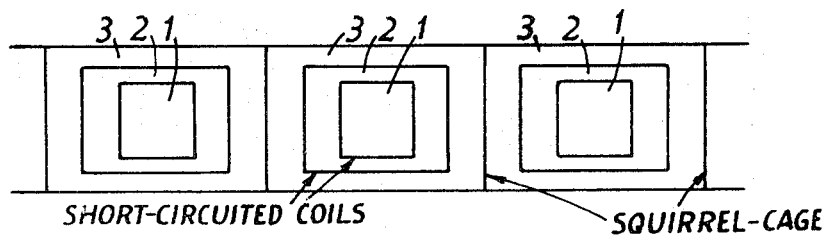
Figure 7B:
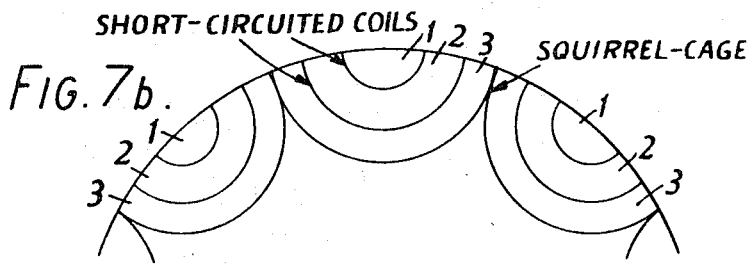
Figure 8:
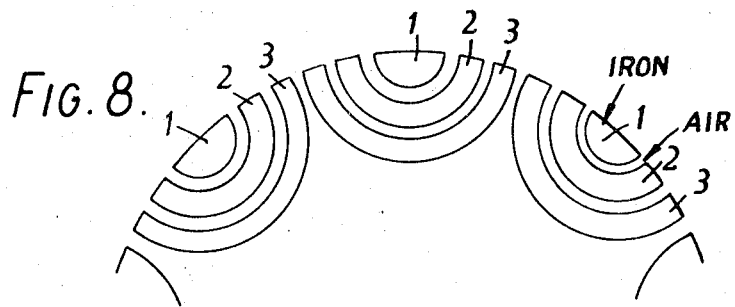
Figure 9:
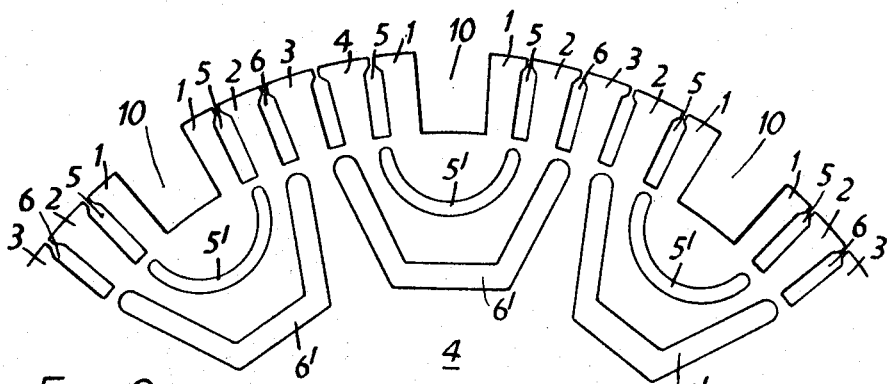

FIG. 6 ($a$ shows a part of a rotor winding having graded conductors and FIG. 6($b$) shows sine waves resprentative of two different pole-numbers;

FIG. 7 ($a$) shows a part of a rotor winding comprising a ($p+q$) – bar squirrel cage and ($p+q$) groups of short-circuited coils and FIG. 7 ($b$) shows the corresponding end view;

FIG. 8 shows a reluctance type of rotor construction resembling the rotor of FIGS. 7($a$) and 7($b$);

FIG. 9 shows a flux-barrier rotor construction;

FIG. 10 shows a segmental rotor construction;

FIG. 11 shows an axially-laminated rotor construction;

FIG. 12 ($a$) and 12($b$) show, respectively, star and delta series connections of a pole-changing, pole-amplitude modulation, three-phase winding of the form which may be used as stator winding for a self-cascaded machine according to the present invention; and FIG. 13 is a slot winding diagram of a 16 pole/6 pole stator winding suitable for the alternative connections described with reference to FIG. 12($a$).

Referring now to the drawings, the basic winding arrangements of a self-cascaded machine are shown in FIGS. 1($a$) and 1($b$) the stator winding being shown in FIG. 1($a$) and the rotor winding in FIG. 1($b$). The stator winding of FIG. 1($a$) is shown connected in three parallel paths per phase.

A more particular description of suitable stator windings is given in the earlier British Pat. No. 1,155,743 referred to and is also given herein with reference to FIGS. 12($a$) and 12($b$) and FIG. 13 of the accompanying drawings, which figures correspond respectively to FIG. 4($a$) and 4($b$) and FIG. 6 of British Pat. No. 1,155,743..

The stator winding of FIG. 1 ($a$) is in effect, a winding of one pole number ($2p$ poles) with respect to the terminal A, B and C, and of a second pole number ($2q$ poles) with respect to the star points S.1., and S.2. and S.3. In general, there may be any number of parallel paths, not merely three per phase as shown in this example.

The rotor winding of FIG. 1($b$) is a ($p+q$) phase short-circuited winding.

The use of the term "phase" in relationship to the rotor winding relates not to the three phases of the supply to the machine, or the output of the machine if it is driven as a brushless alternator, but to the number of short-circuited paths provided by this form of rotor construction.

With the self-cascaded machine of FIGS. 1(a) and 1(b) a rotating $2p$-pole field is established when the terminals A, B and C are supplied from a three-phase alternating current source. When the rotor is in relative motion with respect to the $2p$-pole field, the alternating currents which are induced in the $(p+q)$ – phase rotor winding create a second field of $2q$ poles. E.M.f's are induced between the star points S1, S2 and S3 by the change of $2q$-pole flux linkage with the stator winding. The machine is thus equivalent to two separate machines connected in cascade. The $2p$-pole component of the stator winding is the primary of one machine-element, and the $2q$-pole component of the stator winding is the secondary of the second machine-element.

The machine may be the as a motor asynchronously by supplying alternating currents to the terminals A, B and C and short-circuiting the star points S1, S2 and S3. In addition, the torque-speed characteristic can be controlled by connecting resistors to the star points S1, S2 and S3. Alternatively, some method of slip-energy recovery could be employed.

At near cascade speed, the $2q$-pole field rotates at a low slip-speed relative to the stator. If direct current is supplied to the $2q$-pole component of the stator winding, the rotor will 'pull into step' and run synchronously. For the particular form of connection of the stator winding shown in FIG. 1(a), the direct current may be supplied either through any two star points, or through one star point and the other two joined.

When the machine is driven by a prime-mover, with direct current supplied to the $2q$-pole component of the stator winding, by either connection described above, three-phase voltages are induced between the output terminals A, B and C. The output frequency is given by $n(p+qa)$ Hz where $n$ is the driving speed in revolution per second.

No external connections to the rotor winding are necessary for any of the particular modes of operation. In general terms, therefore, the machine could be said to be a doubly stator-fed self-cascaded machine.

The essential criteria which must be satisfied by the rotor are as follows:

a. When subjected to a rotating field of $2p$ poles the rotor must produce a second field of $2q$ poles.
b. The two fields must rotate in opposite directions, relative to the rotor, for the machine to operate at a speed corresponding to that of a conventional machine of $2(p+q)$ poles.

A rotor which satisfies these criteria may be defined as a $(p+q)$ – phase rotor, and it is so defined in the present specification, or it may alternatively be defined as a $2(p+q)$ – pole rotor.

Known practical forms of rotor windings are shown in FIG. 2 and FIG. 3. FIG. 2 shows a $(p+q)$ phase rotor winding comprising a $(p+q)$ bar squirrel-cage and $(p+q)$ sets of short-circuited conductor loops. The is short-circuited by two end-rings, one at each end.

FIG. 3 shows a $(p+q)$ phase rotor winding in which each phase comprises a concentric group of coils. The winding is short-circuited by a single end-ring.

In general, any form of $(p+q)$ – phase short-circuited winding satisfies the criteria outlined above. The preferred form of rotor winding described in British Pat. No. 1,256,091 is shown in FIG. 2. Each phase winding consists of a squirrel-cage bar and a set of concentric conductor loops. As a matter of practical convenience, the concentric coils may be short-circuited by one of the two squirrel-cage end rings, as shown in the figure.

In some circumstances, it may be desirable to omit the $(p+q)$ – bar squirrel-cage. This will apply, for example, when the number of squirrel-cage bars is small relative to the number of short-circuited coils. The $(p+q)$ groups of concentric coils will then be short-circuited by a single end-ring, as shown in FIG. 3. Alternatively, each coil may be individually short-circuited on itself, or the coils in each group may be connected in series, and each group short-circuited on itself.

The electrical displacement between the individual phase-windings of a $(p+q)$ – phase winding is $2p\pi/(p+q)$ electrical radians, with respect to $2p$ poles, and $2q\pi/(+q)$ electrical radians, with respect to $2q$ poles. For opposite directions of rotation of the two fields relative to the rotor, the rotor winding must be of opposite phase-sequence with respect to the two fields. Thus, $2p\pi/(p+q)$ must equal $[-2q\pi/(p+q) + 2m\pi]$, where $m$ is any integer. This condition is clearly satisfied for $m = 1$. However, if the number of rotor phase-windings is equal to $(p+q)/k$, as distinct from $(p+q)$, then, $2pk\pi/(p+q)$ must equal $[-2qk\pi/(p+q) + 2m\pi]$. The required condition is satisfied for $m = k$. Thus, more generally, the number of rotor phase-windings, $Q_2$, must equal $(p+q)/k$, where $Q_2$ and $k$ must be integers.

The new rotor windings according to the present invention have been devised on the basis of the above analysis. For example, suppose a rotor winding for $(10+6)$ poles, $(12+4)$ poles, or $(14+2)$ poles, is required According to the teaching of Patent Application No. 22,799/68 the number of rotor phase-windings must equal $\frac{1}{2}(p+q)$; which, in each case, is equal to 8. However, the number of rotor phase-windings is now recognized to be more generally given by: $c(p+q)/k$; i.e. 8, 4 or 2. Similarly a $(6+2)$ – pole rotor winding may consist either of four or two phase-windings. The reduced number of phase-windings is advantageous is some instances.

The foregoing argument is more clearly explained in reference to a specific case and the example of a rotor winding for $(6+2)$ pole will now be considered.

According to the teaching of British Pat. No. 1,256,091, a short-circuited four-phase winding would be employed for the particular combination of six poles and two poles. Each phase-winding could take either of the forms shown in FIGS. 2 and 3. Alternatively, the coils of the winding could be short-circuited individually, or the coils in each phase-winding could be connected in series and each series-connected group short-circuited.

A rotor winding according to the present invention, comprising two phase-windings only, is shown diagrammatically in FIG. 4. In general, the winding consists of a number of two-phase components, each phase being composed of a number of concentric coils. For clarity, only eight coils in all are shown. Thus, in FIG. 4, the first phase components 1 comprise the four coils 3, 4, 5 and 6 ad the second phase components 2 comprise the four coils 7, 8, 9 and 10. The first and second phase components are physically arranged at right angles to each other. The component coils in each phase may be individually shorttcircuited, or they may be connected in series and each series-combination of coils short-circuited.

An alternative rotor winding is illustrated in FIG 5. The winding as a whole is there shown short-circuited by two end-rings which, for practical convenience, are situated at opposite ends of the rotor. Thus, in FIG. 5, the first phase components 1 comprise the four coils 3, 4, 5 and 6 short-circuited together by an end-ring 11 and the second phase components 2 comprise the four coils 7, 8, 9 and 10 short-circuited together by an end-ring 12.

In the windings of FIGS. 4 and 5, induced currents must flow in opposite directions on diametrically opposite points of the rotor surface. This would also apply to a four-phase winding. The two-phase windings could therefore, alternatively be described as semi-four-phase windings.

By virtue of the longer coil spans, the two-phase (or semi-four-phase) windings are much more effective with respect to the combination of six poles and two poles, as compared with a true 4-phase winding in which each phase-winding is confined within quarter of the rotor-periphery. An increase in the effectiveness of the rotor winding can provide an overall improvement in the performance of the machine.

In an ideal rotor winding, the number of conductors in successive slots of each phase-winding would be graded according to the summation of two sine waves, of $2p$ poles and $2q$ poles, around the complete periphery of the rotor. A near approach to this ideal, however, is achieved, according to one form of the present invention, by grading the conductors over one phase-band only, and by connecting the conductors of each phase in series. Such an arrangement is illustrated in FIG. 6($a$), which shows four coils 1, 2, 3 and 4 arranged concentrically as one phase-winding.

Two sine waves 5 and 6 of the appropriate pole numbers, which in general may be of different amplitudes, are shown in FIG. 6($b$). The conductors of the coils 1, 2, 3 and 4 are graded according to a compromise between the two sine waves, and may be formed into the concentric winding configuration shown in FIG. 6($a$). For clarity, the series connections between coils are omitted.

This type of winding has obvious advantages in terms of reduced harmonic content, but the utilization of the rotor slot-space is also reduced relatively to an ungraded winding. Its use would be dictated according both to practical consideration and to the particular application and mode of operation of the machine.

A further form of the present invention provides rotors of reluctance type, embodiments of which are shown in FIGS. 7($a$) and 7($b$) and in FIG. 8.

A developed view of a ($p+q$) – phase rotor winding comprising a ($p+q$) – bar squirrel-cage and ($p+q$) groups of short-circuited coils is shown in FIG. 7($a$). An end view of this same winding is shown diagrammatically in FIG. 7($b$).

In FIGS. 7($a$) and 7($b$) are shown three phases of the ($p+q$) – phase winding, each phase compromising a group of concentrically-arranged coils 1, 2 and 3.

There will be noted a clear resemblance between the winding shown in FIGS. 7($a$) and 7($b$) and the reluctance type of rotor construction illustrated in FIG. 8. The rotor of FIG. 8 comprises ($p+q$) groups of axial segments of magnetic material with interspaced air-gaps which form high reluctance flux-barriers in ($p+q$) radial axes. In the figure, each group is shown as having three concentric iron members separated from each other by air-gaps.

The action of a short-circuited coil is, in fact similar to that of a high-reluctance barrier in that each tends to oppose the creation of magnetic flux. There is a fundamental difference between the two forms of construction in that a short-circuited coil will tend to oppose a changing flux linked with it, whereas a flux barrier will tend to prevent the creation of magnetic flux, whether the flux is changing or not. Nevertheless, it can be shown that a reluctance type rotor, normally designed for a ($p+q$) – -pole reluctance motor, will perform the same function as the short-circuited rotor winding in the self-cascaded machine.

A machine which incorporates a reluctance-type rotor is referred to herein as a 'cascade-reluctance' machine, as distinct from a self-cascaded machine.

The rotor of a cascade-reluctance machine is generally of the reluctance type, but may also be wound with any of the rotor windings already described. The machine may be run in any of the particular modes of operation i.e. asynchronously, with or without resistance control; synchronously, as a motor or generator; or as a doubly stator-fed machine. This applies whether or not a winding is included in the rotor. When a rotor winding is employed, no external connections to it are required. The single stator-winding is of the same type as employed in a self-cascaded machine.

The reluctance-type rotor construction of FIG. 8 is schematic and and is not a convenient practical form. Two practical forms of reluctance-type rotors are shown in FIG. 9 and FIG. 10.

The rotor of FIG. 9 is of the flux-barrier type comprising an axial stack of laminations 4 each punched throughout its circumference according to the form illustrated for three phase groups. Each concentric group is made up of inner digital members 1—1, intermediate digital members 2—2 and outer digital members 3—3. The members 1 and 2 are spaced apart by air gaps 5 and 5' and the members 2 and 3 are spaced apart by air gaps 6 and 6'. The members 3 are common to the two adjacent phase groups.

The rotor of FIG. 10 is of segmental construction being made up of a number of segments 7 assembled circumferentially into a complete circle. Three segments are shown in FIG. 10 corresponding to the three phase groups of FIGS. 7, 8 and 9.

Each of the rotor forms of FIGS. 9 and 10 may have axial slots 10 as shown in the figures and such slots are necessary if the rotor also includes a winding. Thus, for example, a reluctance type rotor of the form of FIG. 9 or FIG. 10 may also incorporate a winding of a form shown in, for example, FIG. 4 or FIG. 5 to give a rotor of hybrid construction.

Another form of rotor of hybrid construction is shown in FIG. 11. The rotor 4 of FIG. 11 is of axially laminated construction, as is shown for the three phase groups illustrated, comprising axial laminations 11 of magnetic material interleaved with arcuate sheets 12 of conducting material such as copper or aluminium.

Although the reluctance rotor construction of FIGS. 8, 9 and 10 may be physically identical to that in a reluctance motor, the cascade-reluctance machine operates according to an entirely different principle. The cascade-reluctance machine is essentially a two-field machine, whereas the reluctance motor depends for its action on the existance of a single field. They differ mainly according to the form of the stator winding.

The rotor construction of FIGS. 9 and 10 may be used alone, as a reluctance-type rotor, or in combination with any of the special rotor windings referred to herein, or in British Pat. No. 1,155,743, or in British Pat. No. 1,256,091, as a hybrid-type rotor.

The hybrid-type rotor of FIG. 11 combines the electrical properties of the wound rotor type of FIG. 7 and the reluctance rotor type of FIG. 8. Eddy currents induced in the conducting layers 12 oppose the creation of magnetic flux along the radial axes of high reluctance. The eddy currents and the high reluctance paths are thus cumulative in their effect.

We claim:

1. A self-cascaded three-phase alternating current machine having a stator winding and a rotor, the stator winding having component coils connected between two sets of terminals and being wound to provide a winding of a first pole-number, $2p$ poles, between a first set of said terminals and a winding of a second pole-number, $2q$ poles, between the second set of said terminals and the rotor comprising a $2(p+q)$ pole rotor including electromagnetic means for creating, responsive to rotation of the rotor relatively to a magnetic field of said first pole number, a magnetic field of said second pole-number which rotates in the opposite direction from said field of said first pole-number, relatively to the rotor.

2. A self-cascaded three-phase alternating current machine a claimed in claim 1, in which the rotor is wound with a number of short-circuited phase windings equal to half the sum of said first and said second pole-numbers.

3. A self-cascaded three-phase alternating current machine as claimed in claim 1, in which the rotor is wound with a number of short-circuited phase windings equal to a subintegral multiple of half the sum of said first and said second pole-numbers.

4. A self-cascaded three-phase alternating current machine as claimed in claim 1, in which the rotor is of reluctance type.

5. A self-cascaded three-phase alternating current machine as claimed in claim 1, in which the rotor is of reluctance type and is provided with short-circuited phase-windings.

6. A self-cascaded three-phase alternating current machine as claimed in claim 1, in which the rotor is os laminated construction having groups of arcuate axial laminations alternately of magnetic and of electrically conducting material.

7. A self-cascaded three-phase alternating current machine as claimed in claim 1, in which the rotor is wound with a number of short-circuited phase windings equal to half the sum of said first and second pole-numbers in which the rotor comprises two groups of short-circuited coils arranged physically at right angles to each other.

8. A self-cascaded three-phase alternating current machine as claimed in claim 7, in which the coils of each group are serially connected to one another.

9. A self-cascaded three-phase alternating current machine as claimed in claim 7, in which the coils of each group are connected in parallel and short-circuited by an end ring.

10. A self-cascaded three-phase alternating current machine as claimed in claim 4, in which the rotor is constructed from an axial stack of laminations stamped to provide groups of digital members in complementary pairs spaced apart by gaps.

11. A self-cascaded three-phase alternating current machine as claimed in claim 4, in which the rotor is constructed from axial stacks of segments of magnetic material shaped each to provide a group of digital members in complementary pairs spaced apart by gaps.

12. A self-cascaded three-phase alternating current machine as claimed in claim 1, in which the stator winding comprises two separate winding components, the first wound to provide said first pole-number and connected between said first set of terminals and the second wound to provide said second pole-number and connected between said second set of terminals.

13. A self-cascaded alternating current machine as claimed in claim 1, in which the stator comprises a single, pole-changing winding of the pole-amplitude modulation type, having coils for providing said first pole-number at said first set of terminals and said second pole-number at said second set of terminals.

* * * * *